United States Patent [19]
Srinivasachar et al.

[11] Patent Number: 5,556,447
[45] Date of Patent: *Sep. 17, 1996

[54] PROCESS FOR TREATING METAL-CONTAMINATED MATERIALS

[75] Inventors: Srivats Srinivasachar, Sturbridge; Joseph Morency, Salem, both of Mass.; Daniel C. Itse, Fremont, N.H.

[73] Assignee: Physical Sciences, Inc., Andover, Mass.

[*] Notice: The term of this patent shall not extend beyond the expiration date of Pat. No. 5,245,120.

[21] Appl. No.: 256,552

[22] Filed: Jan. 23, 1995

[51] Int. Cl.$^6$ ............................................. C22B 43/00
[52] U.S. Cl. ................................. 75/670; 588/256
[58] Field of Search ................... 588/256; 75/670

[56] References Cited

U.S. PATENT DOCUMENTS

| | | |
|---|---|---|
| 4,270,875 | 6/1981 | Kainuma . |
| 4,273,747 | 6/1981 | Kasmussen . |
| 4,376,598 | 3/1983 | Brouns et al. . |
| 4,670,634 | 6/1987 | Bridges et al. . |
| 4,701,219 | 10/1987 | Bonee . |
| 4,820,325 | 4/1989 | Wheeler . |
| 4,855,082 | 8/1989 | Duivelaar . |
| 4,859,367 | 8/1989 | Davidovits . |
| 4,941,772 | 7/1990 | Roesky et al. . |
| 4,950,426 | 8/1990 | Markowitz et al. . |
| 5,024,556 | 6/1991 | Timmerman . |
| 5,026,208 | 6/1991 | Beyer et al. . |
| 5,028,272 | 7/1991 | Bonee . |
| 5,034,054 | 7/1991 | Woodward . |
| 5,034,075 | 7/1991 | McMath . |
| 5,198,190 | 3/1993 | Philipp et al. . |
| 5,245,120 | 9/1993 | Srinivasachar et al. ........... 588/256 |

FOREIGN PATENT DOCUMENTS

| | | |
|---|---|---|
| 0001456 | 4/1979 | European Pat. Off. . |
| 0259883 | 3/1988 | European Pat. Off. . |
| 0312174 | 4/1989 | European Pat. Off. . |
| 0412591A1 | 2/1991 | European Pat. Off. . |
| WO91/09664 | 7/1991 | WIPO . |
| WO91/12052 | 8/1991 | WIPO . |

*Primary Examiner*—Melvyn Andrews
*Attorney, Agent, or Firm*—Testa, Hurwitz & Thibeault, LLP

[57] ABSTRACT

A process for treating wastes contaminated by toxic metals and/or organic materials is disclosed. The process involves heating the metal-contaminated wastes to a temperature sufficient to volatilize the metals. This temperature is also high enough to destroy or volatilize organic contaminants. The metal vapors are contacted with a sorbent which is reactive with the metals and sequesters them, thereby forming a non-leachable complex which can be disposed as non-hazardous conventional waste.

35 Claims, 10 Drawing Sheets

PROCESS FOR TREATING METAL-CONTAMINATED MATERIALS

BACKGROUND OF THE INVENTION

Toxic and heavy metals are one of the most problematic classes of contaminants due to their ubiquity and toxicity. Heavy metals represent a significant source of pollution when released into the environment. They are present in fossil fuels and ores, for example, and are released into the environment via airborne emissions during industrial processing of these materials, e.g., during incineration, or leach into soils and groundwater from ash and other residues when these materials are landfilled. Heavy metals from all sources present a major environmental concern.

Heavy metals are present in fossil fuels such as coal, oil and natural gas, in biomass, in ores and in wastes. Heavy metals are volatilized in the hot regions of process units such as boilers, incinerators or furnaces used for waste disposal, energy generation or metal recovery. Subsequently, as the gases are cooled, less volatile metal species (e.g., cadmium and lead) condense onto particles of ash entrained in the gas stream, while more volatile metals (e.g., arsenic and mercury) remain in the gas phase, where they end up as airborne emissions.

Heavy metals include, for example, arsenic, beryllium, lead, cadmium, chromium, nickel, zinc, mercury and barium. Most of these metals are highly toxic to humans and animals. Metal-contaminated wastes often also contain organic contaminants. Thus, treatment technologies for treating wastes contaminated with toxic metals preferably should be effective for treating organic waste as well.

The necessity of dealing with toxic metals has given rise to important and growing technologies devoted to remediating soils, wastes, and other materials contaminated with them, and preventing their escape into the environment. Wastes contaminated with toxic metals and/or organics have been treated, for example, by immobilizing the waste materials or by incineration. Many treatment techniques use cement-forming additives or polymer resins to encapsulate the waste, and subsequently landfill the resulting mass. This technique is costly and may not destroy organics in the waste. Other treatment techniques melt the waste in conjunction with glass-forming materials into a glassy form. These techniques are even more expensive and energy intensive because of the very high temperatures required, and also may result in airborne emissions. Incineration is a more cost-effective treatment for waste remediation as it destroys most organic materials. However, incineration generates airborne emissions and/or residual ash streams containing high concentrations of toxic metals in leachable form. The metal-containing ash then requires further treatment, generally immobilization, to render the metals non-leachable.

In U.S. Pat. No. 4,820,325, Wheeler describes a process for treating a filter cake containing toxic metals, particularly arsenic, which were filtered from a liquid waste stream. This process involves mixing the contaminated filter cake, which is formed of a glass precursor material, with another glass precursor material and heating the mixture to form a molten mass. The mass is allowed to cool, thereby forming a solid glass entrapping the toxic metals.

In U.S. Pat. No. 4,859,367, Davidovits describes a cementation process for immobilizing heavy metals by combining metal-contaminated waste with an alkali-activated silico-aluminate geopolymer binder to form a solid material.

In U.S. Pat. No. 4,941,772 Roesky et al. describe a cementation process for treating contaminated wastes and combustion residues, such as ash, which may contain toxic metals. The process involves mixing the wastes and ash with water and calcium oxide, compacting the mixture to form briquettes and hardening the briquettes in an autoclave with saturated steam.

In U.S. Pat. No. 4,855,082, Duivelaar describes a cementation process for treating chemical waste by immobilizing it in glass. The process involves mixing the waste with molten silica glass and cooling the resulting mixture to form a solid glass entrapping the toxic materials.

These methods suffer from several drawbacks. None of the above methods are completely effective or practical for remediating wastes containing toxic metals, particularly when the metals are associated with organic components. These methods encase the metals in a cementitious material which forms a physical barrier but do not render the metal chemically inert. Methods that involve the formation of a molten glass are very energy intensive. Most importantly, all of the previous methods do not separate the metals from other wastes, which requires that large amounts of the glass or other binder be used to encase nontoxic materials which, if separated from the metals, could be disposed conventionally at a much lower cost.

A cost-effective method of treating wastes and other materials contaminated with toxic metals is needed.

SUMMARY OF THE INVENTION

The invention relates to a process for treating waste, soils or other materials contaminated with metals in order to capture the metals and render them non-leachable. The metals are rendered non-leachable by chemically reacting them with a sorbent thereby sequestering the metals in a permanent water-insoluble complex. The process comprises (1) heating the waste, soils, or other material to a temperature sufficient to volatilize the metals and form a gas stream having the metal vapor and ash particles from the waste entrained therein, (2) cooling the gas stream sufficiently to cause condensation of the metal vapor onto the surface of the ash particles; (3) separating the metal-coated ash particles from the gas stream; (4) combining the metal coated ash particles with a sorbent which is reactive with the metals; and (5) heating the metal-sorbent combination to a temperature sufficient to induce a chemical reaction between the metals and the sorbent to form a non-leachable compound. The resulting material can be safely landfilled or disposed by other conventional means. The residue remaining in the combustion chamber after the metals and organics have been removed generally is sufficiently innocuous to be landfilled or disposed as non-hazardous waste.

A specific embodiment of the process is used when arsenic is present in the waste. In this embodiment, wastes containing arsenic (alone or in addition to other metals) are heated to volatilize the arsenic, and the resulting gas stream containing arsenic vapor is contacted with a sorbent containing calcium and/or magnesium. The calcium and/or magnesium sorbs the arsenic and removes it from the gas stream. Alternatively, arsenic vapor can be removed from the gas stream by contacting the gas stream with a high surface area material, preferably silicate, prior to passing the stream through the sorbent. The arsenic-laden silicate then is combined with the calcium/magnesium sorbent. The sorbent mixture is heated to induce chemical reaction between the metals and the sorbents, thereby forming the permanent complex.

Another specific embodiment of the present invention can be applied when mercury is present in the waste, soils or other materials. Mercury may be released during industrial processing, such as during combustion of coal or natural gas. Like arsenic, mercury is a volatile species and remains in the vapor phase rather than condensing onto the ash particles in the gas stream in step (2) above. Mercury vapor can be captured by carbonaceous sorbents, however, and thus removed from the waste stream. In this embodiment, a carbonaceous sorbent, such as activated carbon, carbon doped with halide salts or unburnt carbonaceous residue from the combustion process, is contacted with in the gas stream, preferably upstream of the particulate removal equipment used to carry out step (3) above. The carbonaceous sorbent sorbs mercury vapor and removes it from the gas stream. The mercury-laden carbon then is collected by the particle collector along with the ash particles. The mercury must be removed from the mixture before it is combined with the sorbent (step 4 above) because mercury will not form a metal-sorbent complex. This can be accomplished by separating the mercury-laden carbon from the other particulates, e.g., by screening or electrostatic means. The mercury-laden carbon sorbent is treated to remove the mercury and regenerate the carbon, and the remaining ash particles are mixed with sorbent and treated as described above. The mercury can be removed from the carbonaceous material, for example, by heat treatment or liquid extraction methods, and the cleaned carbonaceous material can be disposed or reused. The mercury can be collected to treated to form water-insoluble (non-leachable) species.

Soils and wastes which are mixed with soils can be treated in situ using the concept of the present invention. The in situ process is effective both where sorbent materials are present in the soil or must be added. The process involves heating an area of soil to a temperature sufficient to render the metals reactive or to volatilize the metals in the soils. The reactive metals or metal vapors react with sorbents present in the soils, or which are added for that purpose. Heating is continued for a time and at a temperature sufficient to cause reaction between the sorbent and the metals to occur, thereby forming a non-leachable complex. The in situ heating can be performed, for example, by inserting electrodes at the site and running a current between the electrodes or by other forms of electro-magnetic radiation, to heat the soil to the desired temperature.

The present process is a cost effective and efficient method for treating wastes contaminated With toxic metals. The metal-sorbent complex formed by the process is permanent, and the metals will not leach from the complex under environmental conditions likely to occur in a landfill over time. The complex formed by the present process can be landfilled as non-hazardous waste, or can be used as filler, for example, in building materials.

DETAILED DESCRIPTION OF THE INVENTION

Figure 1:
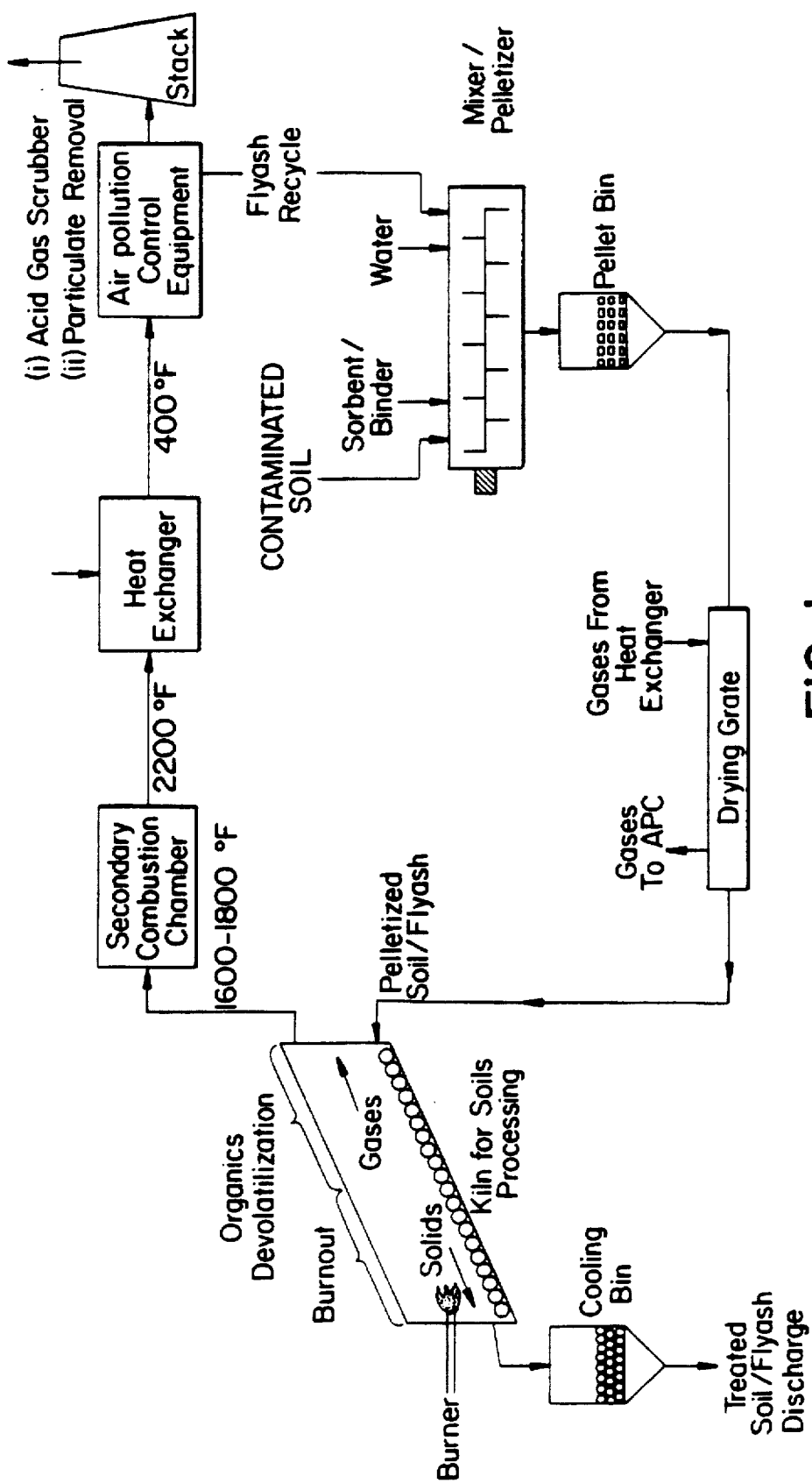
FIG. 1 is a schematic illustration of the process of the invention in which metal contaminated waste is mixed with sorbent, dried, processed in a kiln and disposed as conventional waste.

The present invention relates to a process for remediating waste, soils or other material which is contaminated with toxic heavy metals. The process also destroys any organic contamination which may be present. Stabilized products are formed from which the metals cannot leach. The present process can be utilized with existing industrial processes, such as coal combustion. Coal may contain heavy metals such as lead, mercury or arsenic, and combustion of the coal produces output streams containing ash and flue gases which are contaminated with these metals.

The terms "heavy metals" or "toxic metals" as used herein, refer generally to elements including, for example, arsenic, beryllium, barium, cadmium, chromium, lead, mercury, nickel and zinc. As used herein, the terms encompass the elemental form of these metals as well as organic and inorganic compounds and salts containing them. Many of these elements and compounds are poisonous to human, animal and/or aquatic life.

The first step of present method comprises heating the metal-contaminated material to a temperature sufficient to volatilize the metals, thereby forming a gas stream containing the metal vapor and ash particles. Temperatures effective for volatilizing most metals and metal compounds are in the range of from about 300° C. to about 1500° C. A temperature of about 700° C. to about 1100° C. is particularly preferred for volatilizing a broad range of metal species.

In a preferred embodiment of the method, chlorine is either present in the waste or is added prior to the combustion step. Chlorine is preferably added in the form of hydrochloric acid (HCl). HCl reacts with many of the metal species present in the waste to form the metal chlorides, which are generally more volatile than the elemental form of the metals. A concentration of about 100 parts per million (ppm) of chlorine in the soils, waste or other materials is particularly effective for this purpose.

In the next step, the gas stream containing the metal vapor and the ash particles is cooled to a temperature at which the metal vapors condense on the surface of the ash particles. This step can be accomplished by radiant cooling or by passing the gas stream through a heat exchanger. This condensation generally occurs when the gases to cool to temperatures below about 700° C. The resulting metal-coated ash particles are separated from the gas stream, for example, by passing the gas stream through a filter which catches the metal-coated ash particles. Fabric filters having a pore or mesh size of up to about 10 microns are useful for this purpose. It has been found that metal vapors preferentially condense on particles of about 10 microns or less. Thus, it is preferable to remove larger particles (e.g., greater than 10 microns) from the gas stream prior to the separation step. This can be accomplished, for example, using a 10 micron or larger prefilter, a cyclone or an aerodynamic separator to remove the large particles, located upstream of the particle collector for the small (<10 micron) particles.

A specific embodiment of the present process is used where arsenic is present in the waste. Arsenic may not condense on the fly ash under some conditions. Therefore, where arsenic is present, it is preferable to pre-adsorb the arsenic by imposing a high surface area material, such as a silicate, an iron compound or activated carbon, in the gas stream between the combustion chamber and the particle filter. The silicate or other high surface area material sorbs the arsenic from the gas stream as the gas stream passes through it. The arsenic-adsorbed material is carried with the gas stream to the filter or particle collector where it is removed from the gas stream along with ash particles covered with the other metal species.

The metal-coated ash particles, and/or the arsenic-adsorbed material, if applicable, then are combined with a sorbent. The sorbent is selected so that it chemically reacts with the metals to form a permanent water-insoluble complex. Sorbents which can be used for this purpose include silicates such as sodium, calcium or magnesium silicate, activated carbon, diatomaceous earth and salts of alkaline earth metals. Preferred sorbents have high surface area, and small particle size. Particularly preferred sorbents include activated carbon, aluminum oxide compounds (e.g., $Al_2O_3$, bauxite), silicon-containing compounds (e.g., $SiO_2$) and aluminosilicate compounds (e.g., kaolinite, emathlite, diatomaceous earth), where arsenic is present in the waste to be treated, a calcium or magnesium sorbent is preferred, because arsenic preferentially desorbs from the high surface area material used to capture it onto calcium or magnesium sorbents. Calcium and/or magnesium sorbents useful for this purpose include, for example, calcium or magnesium oxide, hydroxide, carbonate, sulfate or chloride.

The metal-sorbent combination then is heated to induce chemical reaction of the metal species with the sorbent to permanently sequester the metals. This reaction occurs for most metal species at a temperature in the range of from about 300° C. to about 900° C. The metal species react with the sorbents to form non-water soluble (hence, non-leachable) complexes. For example, as shown in the Examples, lead reacts with aluminosilicate sorbents to form lead aluminosilicates, and chromium compounds react to form Cr (III) species (e.g., $Cr_2O_3$) which are water-insoluble. The processed material can be used as fillers for building materials, for example, or can be disposed as conventional waste, e.g., landfilled.

Another embodiment of the present process involves mixing the metal-contaminated waste with sorbent prior to the volatilization step. This embodiment would proceed as follows. Material (ash, sludge, soil) containing the metals is mixed with sorbents containing aluminosilicates and/or alkaline earth compounds (e.g. magnesium oxide, calcium oxide) to form an intimate mixture of the waste and sorbent. The mixture is placed in an oven or other combustion chamber and heated in the presence of oxygen. Heating is preferably gradual, e.g., in steps of 100° C., from about 300° to about 1000° C., each step lasting several minutes. This induces volatilization of most of the metal species, which then are captured by the sorbent. Heating is sustained for a time and temperature sufficient to cause chemical reaction between the metals and the sorbent. To maximize capture of the metals, any metal vapors that escape the reaction vessel are collected downstream, remixed with sorbents and reprocessed in the same manner.

In carrying out the process of the invention, it is important that the metal species and the sorbent are in intimate contact to facilitate chemical interaction between them. A preferred method of ensuring intimate contact is to compress the metal-containing material and the sorbent together. This can be accomplished, for example, by pelletizing or briquetting the mixture to form pellets, bricks, tiles or other shapes. This step can be performed in several ways, depending upon the processing conditions used. For example, when the sorbent is mixed with the waste prior to thermal processing, the waste-sorbent mixture can be first pelletized and the pellets heat-processed as described above. Where the waste is first thermally processed to volatilize the metals, the mixture of the metal-coated ash particles and sorbent is pelletized, and the pellets heated to induce the chemical reaction. In a particularly preferred embodiment, metal-containing material is encapsulated in the center of the pellet (or other shape) and is surrounded by an outer layer of sorbent. It has been found that this layered configuration enhances metal capture. A pellet or briquette having a diameter in the range of approximately ¼ inch to 2 inches or larger, is preferred for this purpose. Pelletization can be accomplished by simply compressing the material at very high pressures in a small pellet die. Other commercially available pelletizing or briquetting equipment (for example, brick-making equipment) also can be used.

Equipment to carry out the entire process, including a furnace, can be mobilized, for example, by placing on a flatbed truck, for use at remote sites where treatment can be concluded in a single batch.

Sorbents which occur naturally in the proximity of the particular waste site can be used in the process, thus reducing the overall process costs. For example, ash from coal-fired power plants where bituminous coals are fired might be a source for aluminosilicate sorbents. Additionally, ash from a coal-fired power plant where lignite or sub-bituminous coals are fired could be a source of alkaline earth (e.g., MgO, CaO) compounds. Other fuels could be substituted for coal, for example wood. Any materials containing inorganic compounds of aluminum, silicon, calcium and magnesium, or a combination thereof, are useful as sorbents provided that they will react with the metal species to form a permanent water-insoluble complex.

A schematic illustration of one embodiment of the present process is shown in FIG. 1. It consists of first mixing the waste with the sorbents, then forming pellets or bricks from the resultant mixture to ensure intimate contact between the sorbent and the metal species. The mixture is dried, then heated in a combustion chamber so that any organic components are devolatilized and the resulting carbonaceous residue is burnt out. Heating is carried out for a time and temperature sufficient to complete reaction of the metal species with the sorbent. Any metal vapors which escape the combustion chamber will condense on the ash particles entrained in the gas stream. The particles are removed from the gas stream as described above, and returned to the sorbent mixture, as shown in FIG. 1. Thus, the emissions released into the atmosphere from the stack are substantially free of toxic metal species and organic contamination. Likewise, the residue remaining in the combustion chamber after volatilization of the metals and destruction of the organic material is sufficiently free of these harmful contaminants to be safely disposed in a landfill. This version of the process is best applied to wastes with high concentrations of metals and where the waste can be physically manipulated to form uniform pellets or bricks.

Figure 2:
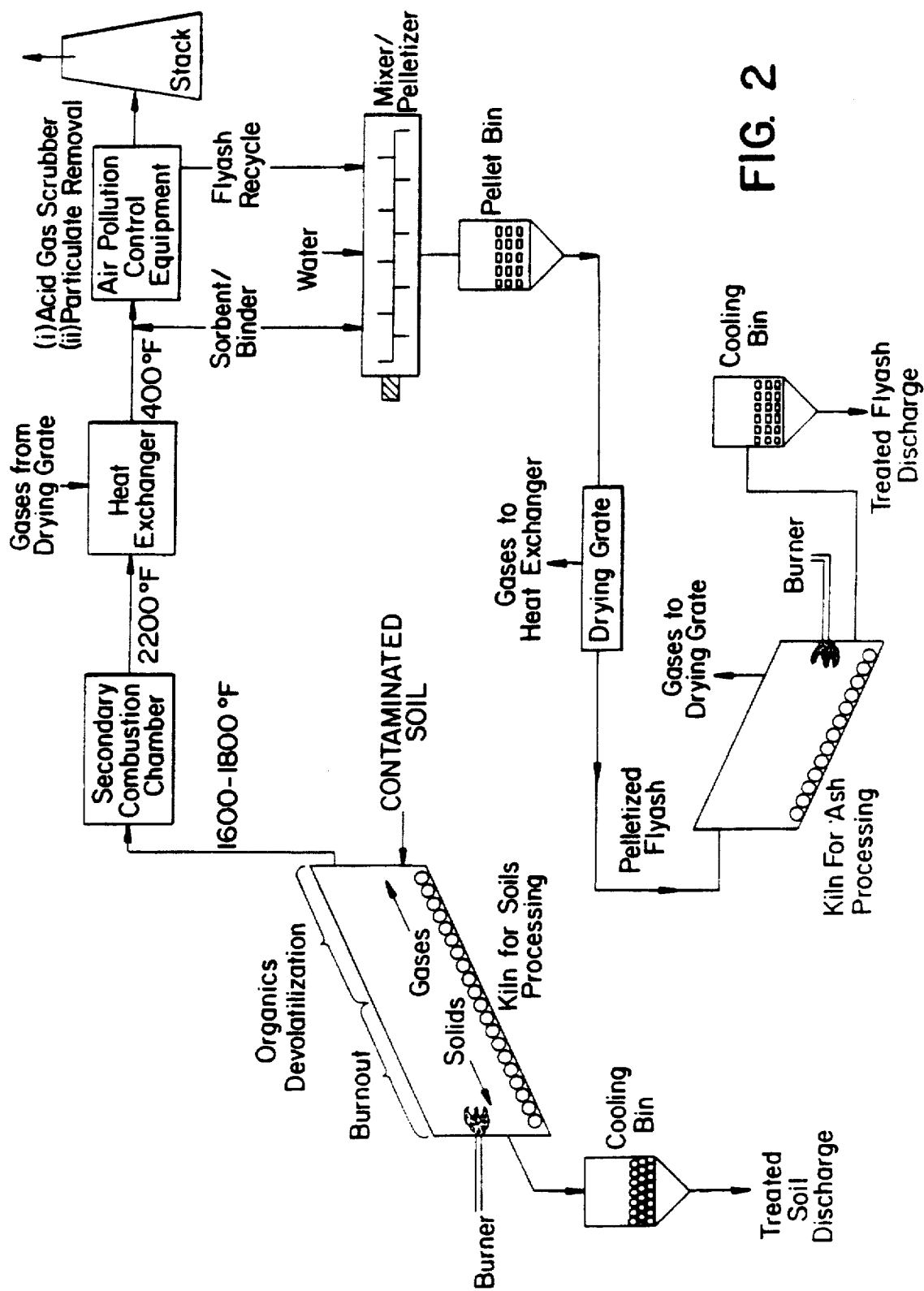
FIG. 2 is a schematic illustration of the process of the invention in which metal contaminated waste is heated to volatilize the metals and destroy any organics, the resulting metal coated flyash is collected and mixed with sorbent and the mixture is heated to form a water-insoluble metal-sorbent complex.

A more preferred embodiment of the process is shown in FIG. 2. This embodiment is more applicable when the waste is physically inhomogeneous and where the metal concentrations are low or moderate. It consists of placing the wastes in a combustion chamber or kiln and heating them to a temperature sufficient to induce volatilization of the metals in the waste and destruction of any organic material (which is reduced to carbon dioxide and water). The residue left in the combustion chamber is discharged for landfilling or other disposal. The metal vapor, gas and ash produced by combustion of the wastes goes out of the reaction chamber. At this point, optionally, the gas stream can be further processed in a secondary combustion chamber. The hot gas having the ash particles and metal vapor entrained therein is allowed to cool by passing through a heat exchanger or by some other method, for example, by addition of a cooling liquid. As the gas cools, the metal vapors condense on the flyash, preferentially on particles 10 microns or less in size. The metal-coated flyash is then collected by a filter or other particulate removal device. The rest of the gas is allowed to exit the stack, and the metal-coated ash particles are combined with the sorbent of choice. The ash particles and sorbent preferably are combined in such as way as to ensure intimate contact between the metal-coated ash particles and the sorbent. The metal-sorbent mixture then is heated to a temperature sufficient to drive a chemical reaction between the metal and the sorbent. The temperature history that needs to be provided depends on the combination of trace metals and the chemical and physical forms of the trace metals contained in the waste.

As indicated above, the sorbent can be added to the waste stream containing the organics or to the ash stream resulting from the organics destruction process. It is also sometimes appropriate to add the sorbent into the furnace during the organics destruction stage, as this allows reaction between the vaporized metal species and the sorbent to proceed to a certain extent before the ash and the partially-utilized sorbent are collected in the dust capture equipment.

In another embodiment of the present process, soils or wastes contaminated with toxic metals are treated in situ. In this embodiment, an area of contaminated soil is heated to a temperature sufficient to render the metals reactive or to volatilize the metal species present in the soil. The reactive metal species or metal vapors are captured by and react with sorbents naturally present in the soil, such as sand, or other inorganic oxides. If naturally occurring sorbents are insufficient, externally added sorbents can be layered on or mixed with the soil prior to the heating step. For example, where arsenic is present in the soil, a sorbent specific for capturing arsenic can be added. Where mercury is present, a carbonaceous sorbent is added to adsorb the mercury vapor. The mercury-laden carbon then can be separated from the other sorbents as described herein. Heating is maintained for a time and temperature sufficient to induce chemical reaction between the metal vapors and the sorbent to occur, thereby forming the permanent complex. The in situ heating can be performed, for example, by inserting electrodes in the soil and running a current between the electrodes, or by other means. HCl can be added to the soil to form the more volatile metal chlorides, if necessary or desirable. The soils are preferably heated to a temperature of at least 300° C., up to about 1500° C., depending on the metal species present, to volatilize most metal species or to render them reactive. The in situ process forms an inert material which does not leach toxic metals, or compounds containing them.

Pollution control equipment, for example, for removing particulates, sulfur oxides, nitrogen oxides, and mercury from the gas stream, can be used in conjunction with the process.

Some of the processes for which this invention is applicable may generate ash that does not pose an environmental hazard because the concentrations of leachable toxic heavy metals in the ash are small. However, volatile heavy metals may be associated with the ash and the flue gases that are not captured by the particulate removal equipment. Arsenic and mercury are examples of such volatile heavy metals. A method for removing arsenic from the gas stream and immobilizing it is discussed in detail above. Where mercury is present, an additional step is needed. Airborne emissions of mercury can be reduced by the addition of carbon to the flue gas stream. Therefore, when mercury is present, it is preferable to pre-adsorb the mercury from the gas stream by imposing a carbonaceous material or sorbent in the gas stream between the combustion chamber and the particle collector. The carbon sorbs mercury vapor and removes it from the gas stream. The mercury-laden carbon then can be collected with the fly ash in the particulate filtering equipment e.g., the baghouse, electrostatic precipitator, cyclone or scrubber. The particulates (ash and carbon) collected by the particulate removal equipment are contaminated with mercury. Disposal of the particulates in landfills or by recycling, such as in cement making, poses an environmental hazard because the mercury can be mobilized by revolatilization or be taken up by living organisms. A method is therefore required for isolating the captured mercury in a concentrated and, preferably, in an immobilized form, and for separating it from the remainder of the particulates.

The process for removing mercury generally comprises the following steps:

1) a carbonaceous sorbent, such as activated carbon, carbon doped with halide salts, or unburnt carbonaceous residue from the combustion process, is injected upstream of the particulate removal equipment where it sorbs the mercury present in the gas stream;

2) the carbonaceous mercury-laden sorbent is collected along with the ash and other inorganic particulates in the particulate removal equipment; and 3) the carbonaceous mercury-laden sorbent is separated from the ash, for example, by screening or by electrostatic means.

In cases where the flue gas stream does not contain particulates (for example when burning fuels like natural gas or downstream of existing particulate control equipment) step (c) may not be necessary.

Once the mercury-laden carbonaceous material is separated from the ash, the ash can be mixed with sorbent and treated as described above (e.g., heated to form an insoluble complex), and the carbonaceous material can be further treated to remove the mercury, i.e., regenerated. Regeneration of the carbonaceous sorbent and separation of mercury can be accomplished, for example, by (a) heating the mercury-laden carbon to a temperature of about 350°–400° C. with a purge flow (e.g., of air) to drive the mercury out, followed by quenching of the purge flow to around 20° C. to condense the mercury; or (b) extracting the mercury from the carbonaceous sorbent using an aqueous or acidic solution, followed by drying of the sorbent. Treatment of the liquid extract with a solution containing sodium sulfide or other sulfide salt at an alkaline pH (around 10 to 12) precipitates the mercury and any other metals that might have been extracted from the carbonaceous sorbent as insoluble sulfides. Some or all of the regenerated carbonaceous sorbent optionally can be injected into the combustion process (e.g., boiler) for disposal and, if necessary or desired, fresh make-up carbonaceous sorbent can be to the regenerated carbonaceous sorbent for reinjection into the flue gas.

In one embodiment of the present mercury-removal process, a finely divided (5–100 µg) high surface area carbonaceous sorbent, such as activated carbon or carbon doped with halide salts (e.g., sodium chloride), is injected into the flue gases at temperatures about or below 250° C. and upstream of any particulate removal equipment. Unburnt carbonaceous material generated in the combustion process itself alternatively may be used as a source of carbon. If desired, unburnt carbonaceous material may be generated in situ by changing combustion process operating conditions, for example by increasing the fuel/air ratio or by providing shorter residence time for burnout of the carbonaceous material. Unburnt carbonaceous material generated during combustion can be separated from the ash collected by the particulate removal equipment. The concentration of carbonaceous sorbent added is preferably about 50–100 mg sorbent per standard cubic meter of flue gas. Residence times for the carbon of greater than 100 milliseconds are preferred to ensure maximum sorption of mercury.

The carbonaceous sorbent containing the mercury will be captured in the particulate removal equipment along with other particulates. A fabric filter is preferred for particulate removal as it collects the carbon sorbent as a filter cake on the bags, thus forcing further contact of the flue gases with the sorbent. This provides an additional opportunity for capture of the mercury species. After this step, the particle filter will contain a mixture of the fly ash (which may have various metal species condensed thereon), and mercury-laden carbon material.

The mercury-laden carbonaceous sorbent is separated from the ash in order to avoid problems which may arise from the codisposal of mercury-containing sorbent and ash. This may be achieved in any of several ways including, for example, by electrostatic separation, screening, density classification, or magnetic separation. Electrostatic separation of conductors from non-conductors or of materials with dissimilar surface electrical properties, i.e. Fermi levels, has been described, for example, by Blake and Morscher in U.S. Pat. No. 668,791 (1901); Lawver in U.S. Pat. No. 2,805,760 (1957); and Steutzer in U.S. Pat. No. 3,249,255 (1966), which are incorporated herein by reference. In the electrostatic separation process, ash combined with carbon is introduced onto moving screens within a narrow region (about 3–5 millimeters) formed between two high voltage electrodes. Due to triboelectrification or contact charging, the ash particles acquire a negative charge, while the carbon or unburnt carbonaceous material acquires a positive charge. As the top and bottom screens move in opposite directions, the ash particles move towards the positive electrode and remain on the top screen; the carbonaceous particles fall through to the bottom screen as it is attracted towards the negative electrode. This results in two product streams enriched in the ash and carbonaceous components, respectively.

Separation of the carbonaceous sorbent and ash alternatively can be achieved by screening if the particle size of the carbon does not overlap that of the ash. While it is recognized that finer carbon particles are expected to be more effective as sorbents, coarser carbon might be adequate to achieve the required mercury removal. In ash generated by typical coal fired power plants, greater than 95 percent of the ash particles are smaller than 40 microns. Other combustion processes might generate even finer ash. If the carbon material injected as a sorbent is coarser than the ash, then it can be separated by screening. A carbon particle size which is greater than the size of a predominant fraction of the ash particles (for example, in the case described above, greater than about 40 microns) is preferred if screening is chosen as the method to separate the carbonaceous material and the ash.

Once the mercury-laden carbonaceous material is separated from the other particulate material, the mercury species are removed and the carbonaceous material is disposed or regenerated. Regeneration of the carbonaceous sorbent can be achieved, for example, by heat treatment or liquid extraction. In the heating method, the mercury-laden carbon is heated up to about 350° to 400° C. in the presence of a small purge air flow. Heating to these temperatures causes the mercury to volatilize, and the purge flow carries the mercury vapors away from the sorbent. Mercury can be recovered from the purge flow by cooling it to around 20° C., for example using a water spray, causing the mercury to condense. The purge flow still may contain residual mercury, and therefore is preferably directed back to the main combustion process upstream of the carbonaceous sorbent where it can be recaptured. The regenerated carbonaceous sorbent may be reactivated by steam or by impregnation of halide salts.

In the liquid extraction method for regeneration, the mercury-laden carbon is mixed with an aqueous or acidic solution and agitated to dissolve the mercury salts, thereby separating them from the carbon. The carbon then can be filtered, dried, pulverized, if needed, and reactivated. The liquid extract can be treated to remove the mercury by adding a solution containing sodium sulfide or other sulfide salt at an alkaline pH (about 10 to 12) to precipitate the mercury, and any other metals that might have been extracted from the carbonaceous sorbent, as insoluble sulfides. Alternatively, the liquid extract may be treated with a cationic exchanger specific for mercury removal.

After regenertion, the carbonaceous sorbent can be disposed by burning it in the boiler as fuel. This step may be performed before sorbent regeneration. Alternatively, all or part of the regenerated sorbent may be combined with fresh carbonaceous sorbent and reused.

In another embodiment of the process, an aqueous carbon slurry consisting of finely divided carbon (1–50 µm) or an aqueous carbon slurry treated with dopants such as dissolved halide salts, is injected as fine droplets (1–50 µm) into the flue gases. Unburnt carbonaceous material generated in the combustion process may be used in the slurry. The carbon slurry preferably is injected at a point where the flue gas temperature is about 250° C., and where sufficient time is allowed for droplet drying before the carbon particles reach the particulate removal equipment. The aqueous droplets provide a cooled region in the boundary layer around the carbon particles as the water vaporizes (endothermic process) thus enhancing the condensation of mercury on the carbon particles. The presence in the droplets of halide salts, which exist as dissociated ionic species, enables the reaction of mercury to mercury halide thereby enhancing its capture.

After droplet drying, the carbon particles act as mercury sorbents as well. The rate of mercury capture can be increased by oxidizing the gas phase mercury at the droplet surface. This can be accomplished, for example by providing an oxidizing component in the slurry, such as dissolved hydrogen peroxide.

The second and third steps in this embodiment are identical to the dry sorbent injection embodiment and comprise: (a) collecting the mercury-laden carbonaceous sorbent along with the ash in particulate removal equipment, followed by, (b) separation of the carbonaceous sorbent from the remainder of the ash by screening or electrostatic means. Once the carbonaceous sorbent and the ash are separated, the carbonaceous sorbent may be regenerated as described above. The decontaminated/regenerated sorbent then can be slurried with water and/or dopant (such as a halide salt) and/or oxidizer (such as hydrogen peroxide) for reinjection into the flue gas. The mercury-remediation protocol can be used in conjunction with the arsenic removal protocol in addition to the general process where a wide variety of metal contaminants are present which include both mercury and arsenic.

The process of the invention can be used to treat any solid waste stream, for example, municipal waste incinerator ash, metal-processing furnace ash, dust, contaminated soil or sludge. The metals found in various wastes can include, for example, different compounds of beryllium, lead, cadmium, mercury, nickel, zinc, barium, arsenic, and chromium. The present process has been applied to most of these metals in the laboratory, as described in the Examples, and a range of conditions has been determined that would render any combination of them non-leachable, thus enabling waste containing them to be treated and safely landfilled.

The invention will be further illustrated by the following examples, which are not intended to be limiting in any way.

EXAMPLES

Three types of experiments were conducted to examine trace metal capture and immobilization using the present process. The first set of experiments consisted of vaporizing the trace metal species and passing the vapors through a fixed bed of the sorbent (fixed bed experiments). The percentage of the vapors captured by the sorbent bed and the leachability of the captured metal species were then determined. In the second set of experiments, the sorbent and the trace metal compounds were mixed and formed into pellets (pelletization experiments). The pellets then were subjected to heat treatment and the percentage of the trace metal retained in the pellet and its leachability were determined. In the third set of experiments, sorbent was introduced into the hot gas flow containing trace metal vapor species (entrained flow experiments), and the rate of capture as a function of process conditions noted. Each of these is described below.

Fixed Bed Experiments

Figure 3:
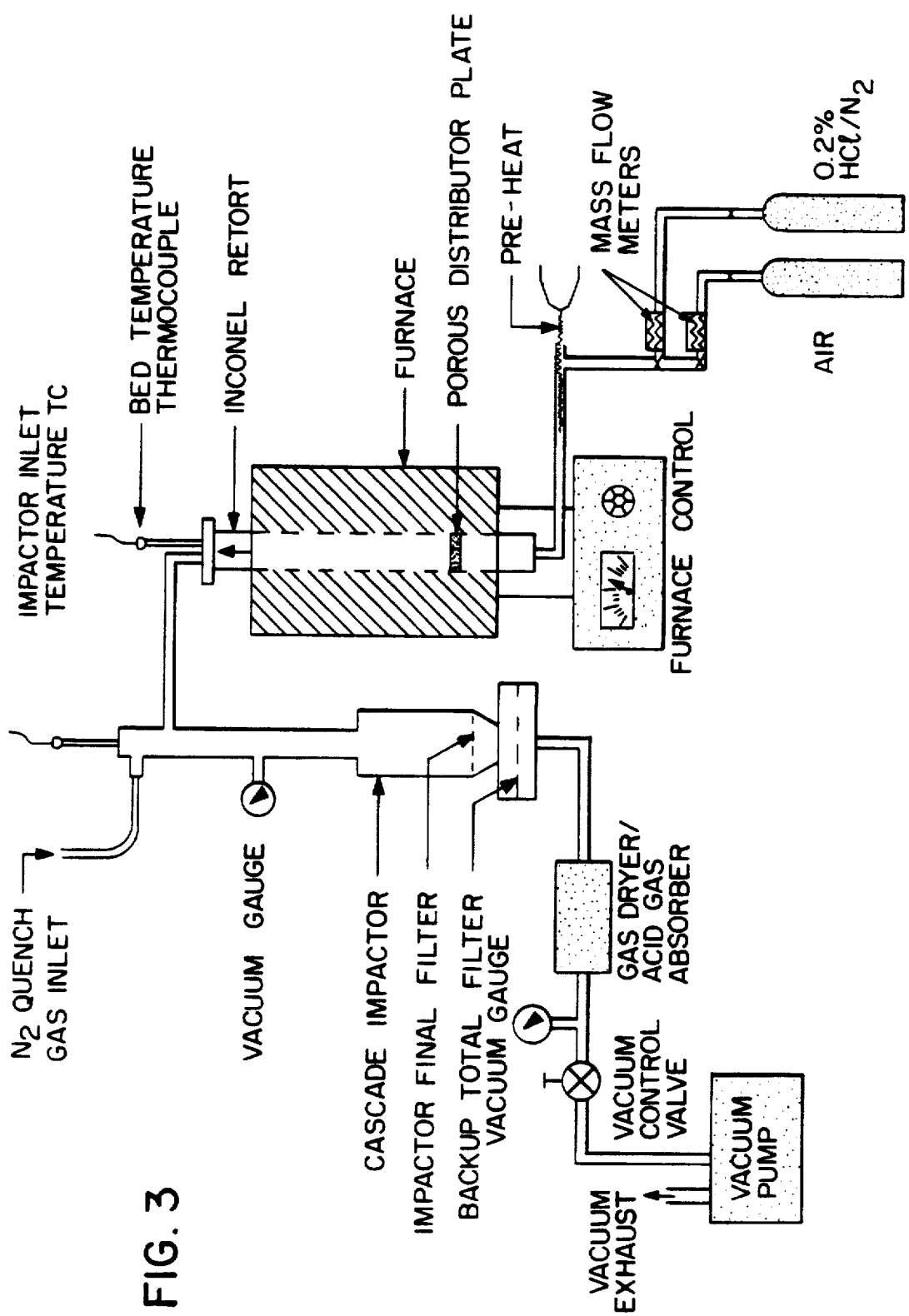
FIG. 3 is a schematic illustration of a fixed bed apparatus used to carry out the process of the invention.
Figure 4:
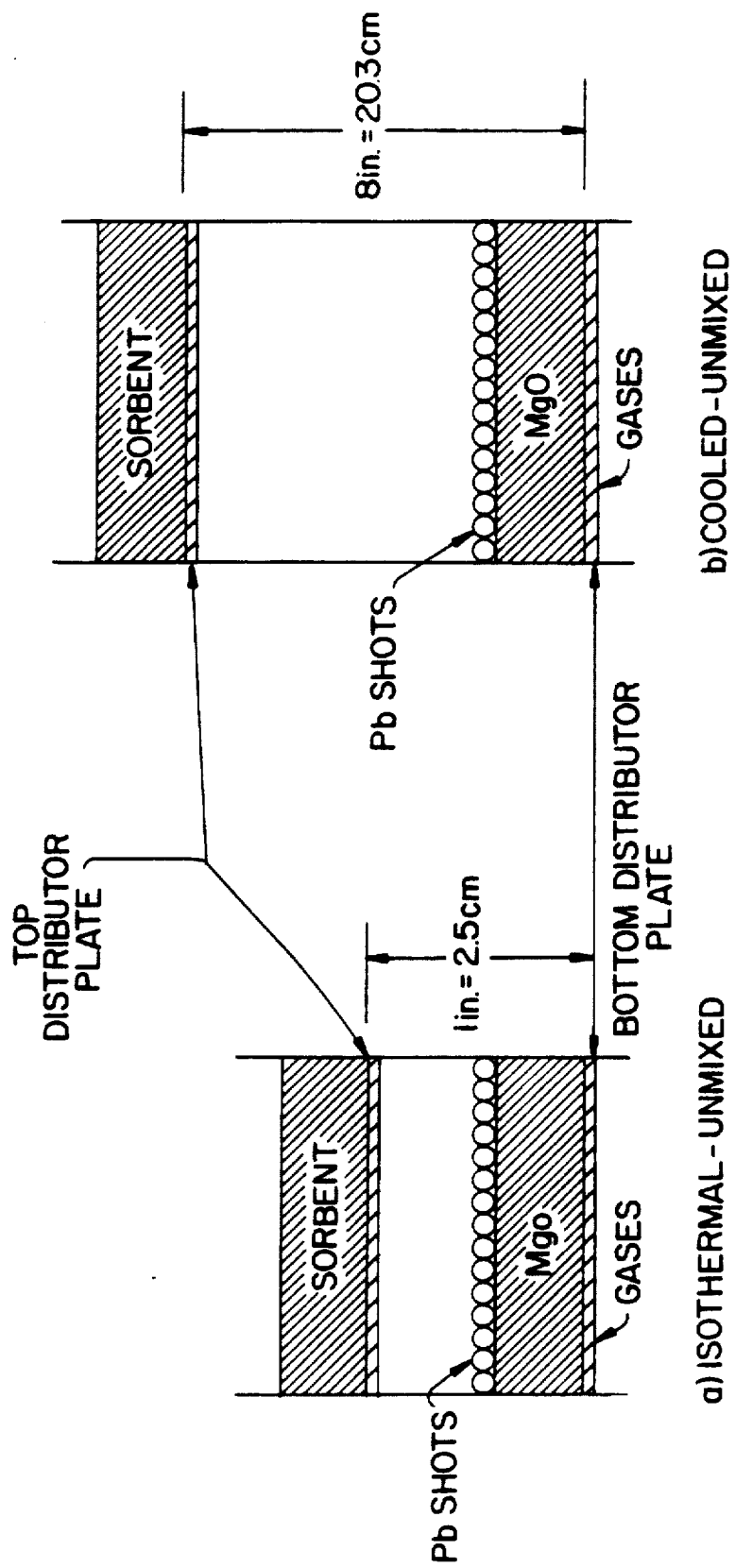
FIG. 4 is a schematic illustration of a fixed bed apparatus in which the heavy metal species to be tested was placed upon a bed of inert magnesium oxide particles.

The fixed bed experimental testing facility used for the following experiments is illustrated schematically in FIG. 3. The facility utilized an externally heated inconel tube for combustion of the waste. The furnace was capable of operation at temperatures up to 1200° C. The gases entering the reactor were metered, and consisted of different mixtures of nitrogen, oxygen, hydrogen chloride, sulfur dioxide, and water vapor. Vapor phase lead species were generated by heating lead shot placed on the top of a bed of inert magnesium oxide particles, as shown schematically in FIG. 4. Lead vapors produced by heating the shot were carried through the sorbent bed above it. After passing through the reactor the gases were cooled by quenching with nitrogen gas. The vapor phase lead species condensed as a result of the cooling process, and the small lead-containing particles were then collected on a filter and weighed. The capture efficiency of the sorbent bed with respect to lead species was determined by conducting the experiment with and without the sorbent bed.

Figure 5:
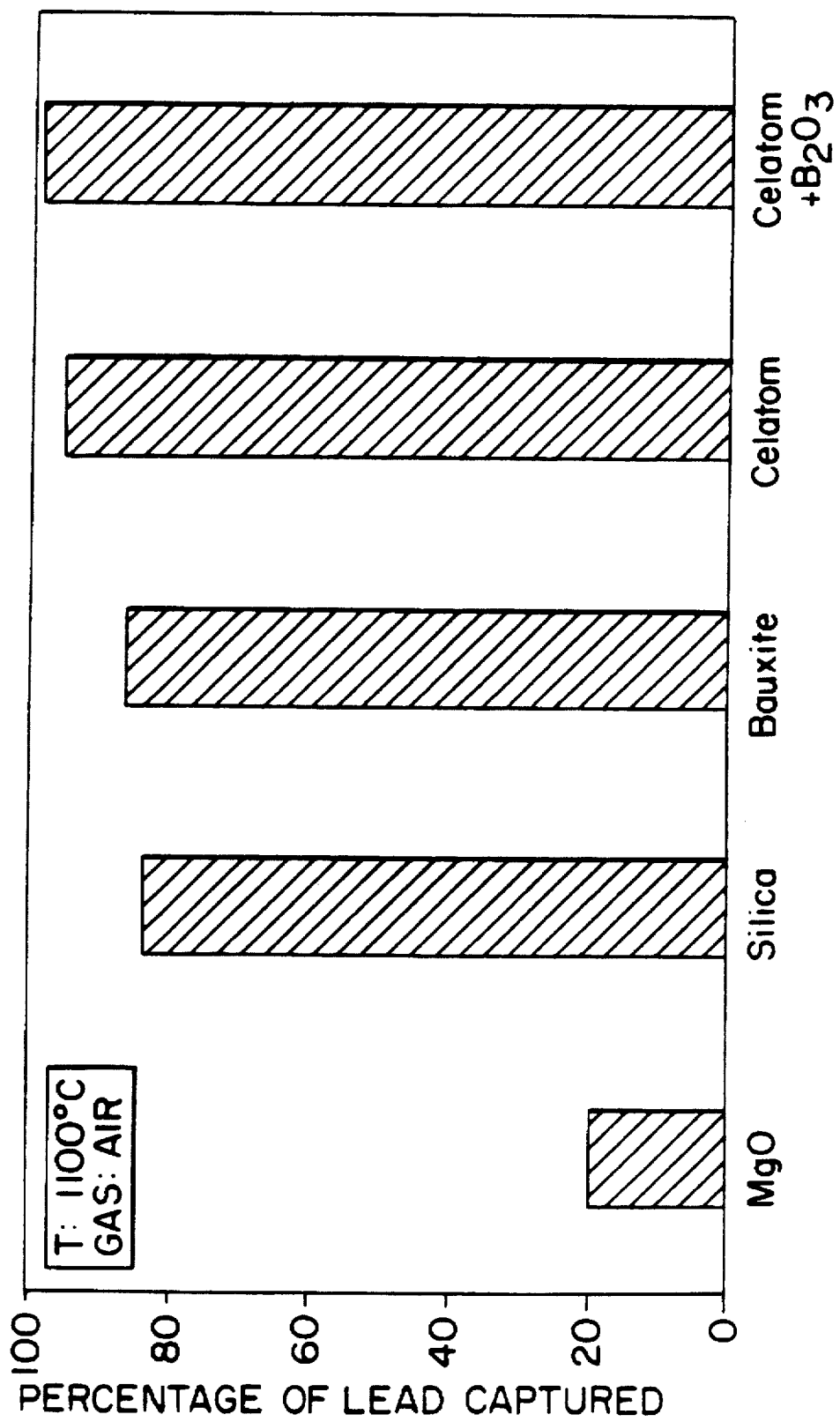
FIG. 5 is a graph showing the percentage of lead species captured by various sorbents.

The percentage of lead species captured by various sorbents in air at 1100° C. is summarized graphically in FIG. 5. As shown in FIG. 5, over 80% of the lead vapor was captured using silica, bauxite and diatomateous earth (Celatom™ brand) sorbents. The composition and the size of the sorbents used is shown in Table 1.

TABLE 1

| Composition and Size of Sorbents Used | | | | |
|---|---|---|---|---|
| | Bauxite* | Celatom° | Silica** | Celatom + Boron Oxide°° |
| 1. Composition (wt %) | | | | |
| $SiO_2$ | 10.0 | 92.0 | 99.8 | 87.4 |
| $AL_2O_3$ | 81.5 | 5.0 | — | 4.8 |
| $Fe_2O_3$ | 3.0 | 1.8 | — | 1.7 |
| CaO | — | 0.2 | — | 0.2 |
| MgO | — | 0.3 | — | 0.29 |
| $TiO_2$ | 3.5 | — | — | — |
| $B_2O_3$ | — | — | — | 5.0 |
| Others | 2.0 | 0.3 | 0.2 | 0.29 |
| 2. Size | 300–600 µm | 300–500 µm | 1.4–4 mm | Celatom: 300–500 µm $B_2O_3$: <250 µm |

*Porocel bauxite from Engelhard Minerals and Chemical Corp., Arkansas.
°Diatomaceous Earth, MP-79 from Eagle-Picher Industries, Nevada.
**Silica from Cerac Inc., Wisconsin.
°°Boron oxide from Aesar, Johnson-Mathey Inc., New Hampshire.

Figure 6:
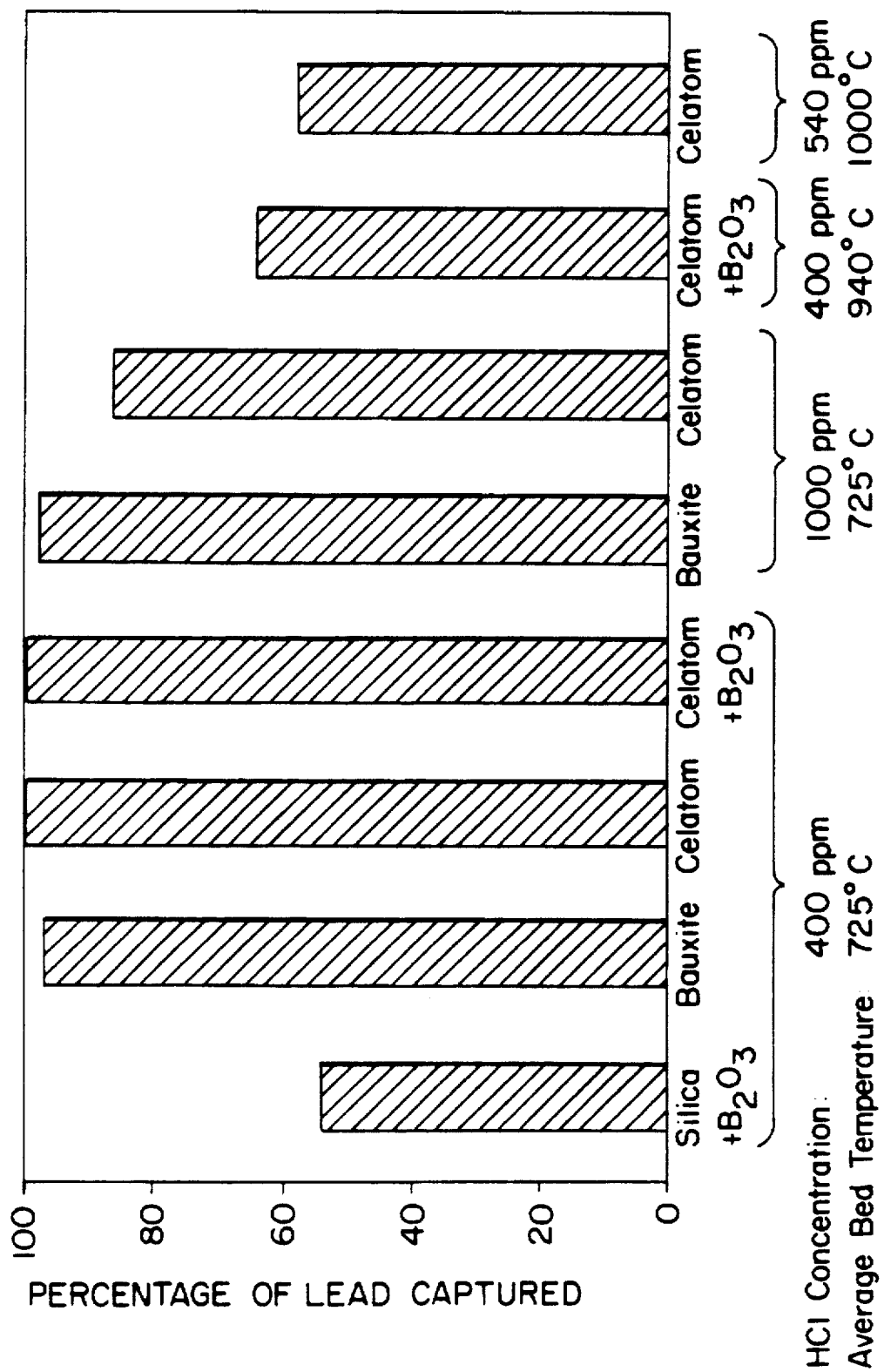
FIG. 6 is a graph showing the percentage of lead species captured by various sorbents in the presence of different concentrations of HCl.

Hydrogen chloride (HCl) typically is generated in actual waste destruction processes (e.g. incineration). High concentrations of HCl can decrease the capture efficiency of some sorbents. To test the efficiency of the process where HCl is present, HCl was added to the reactor in the above-described process at concentrations of 400 ppm to 1000 ppm. The behavior of various sorbents with respect to lead capture in the presence of hydrogen chloride is summarized graphically in FIG. 6. As shown in FIG. 6, aluminum-based sorbents, such as bauxite and diatomaceous earth, were very effective in capturing lead even at high chloride concentrations.

Leachability Experiments

In addition to testing vapor phase capture, experiments were conducted to determine whether the product of the sorbent-metal reaction is nonleachable. Standard EP Toxicity measurements were performed on the lead-sorbent products formed in the fixed bed experiments above, and the data are summarized in Table 2. The EP Toxicity Test Method used was U.S. Environmental Protection Agency Method 1310. This test is used to determine whether waste exhibits toxicity as defined by 60 C.F.R. 261.24 and Appendix II of 40 C.F.R. part 261. Briefly, the solid waste is ground to a size that passes through a 9.5 mm sieve, and extracted with deionized water having a pH of 5.0±0.2 which is maintained using acetic acid. Extraction is carried out by agitating 1 part of waste mixed with 20 times by weight (based on the waste) of water for 24 hours at 20°–40° C. The mixture is filtered using a 0.45 µm filter and the liquid extract analyzed for metals using atomic absorption or emission spectroscopy. The current regulatory upper limit for lead leachability is 5 mg/l as determined by the EP Toxicity test. As shown in Table 2, the leachability of lead from the complexes formed the present process was well below that limit. Sorbent A is Celatom™–$B_2O_3$ and sorbent B is Celatom™.

TABLE 2

LEACHABILITY OF SORBENTS WITH CAPTURED LEAD

| | | | Lead Concentration by | | | |
|---|---|---|---|---|---|---|
| | | Estimated Loading | HF Extract. | Conc. $HNO_3$,HCl Extraction | EP Toxicity | |
| Sorbent | HCl Concentration | mg/kg Solid | mg/kg Solid | mg/kg Solid | mg/kg Solid | mg/l Solution |
| A | 0 ppm | 11,000 | 6,000 | 3,100 | 40 | 2.0 |
| B | 400 ppm | 1,100 | N/A | 560 | 16 | 0.8 |

Pelletization Experiments

Figure 7:
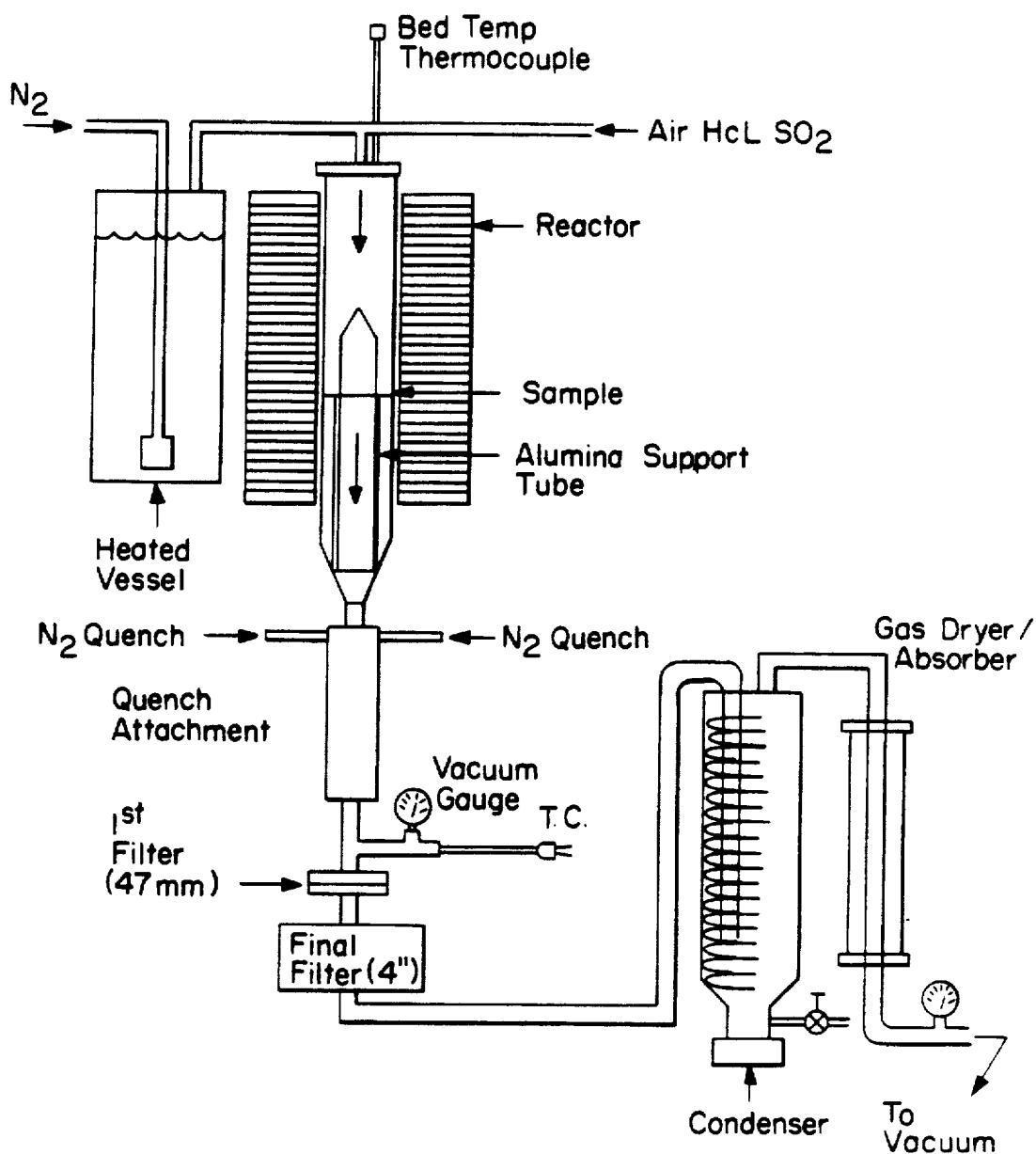
FIG. 7 is a schematic illustration of an apparatus used to test the process of the invention in which metal-coated flyash from a municipal waste incinerator was formed into pellets, coated with sorbent and heated to form a water-insoluble complex.

The first series of experiments were carried out to investigate the feasibility of immobilizing heavy metals which are present in flyash obtained from incineration of municipal solid waste. Flyash containing lead was obtained from a commercial incinerator. Pellets were made from the ash with a Beckman Model K13 KBr Die and Carvel Model C Laboratory Press. The size of the pellets were 13 mm in diameter and their thickness was determined by the amount of material placed in the die. These pellets then were coated with Celatom™ sorbent in a balling drum. The final proportion of the sorbent to ash in the coated pellets was 1:1. Separate experiments were performed using the apparatus shown in FIG. 7 in which (a) pellets containing only flyash, and (b) pellets containing flyash coated with the sorbent, were exposed to temperatures ranging from 800° to 1100° C. The metals vaporized during each experiment were recondensed via a nitrogen-purged/quenched probe and collected onto a filter.

Figure 8:
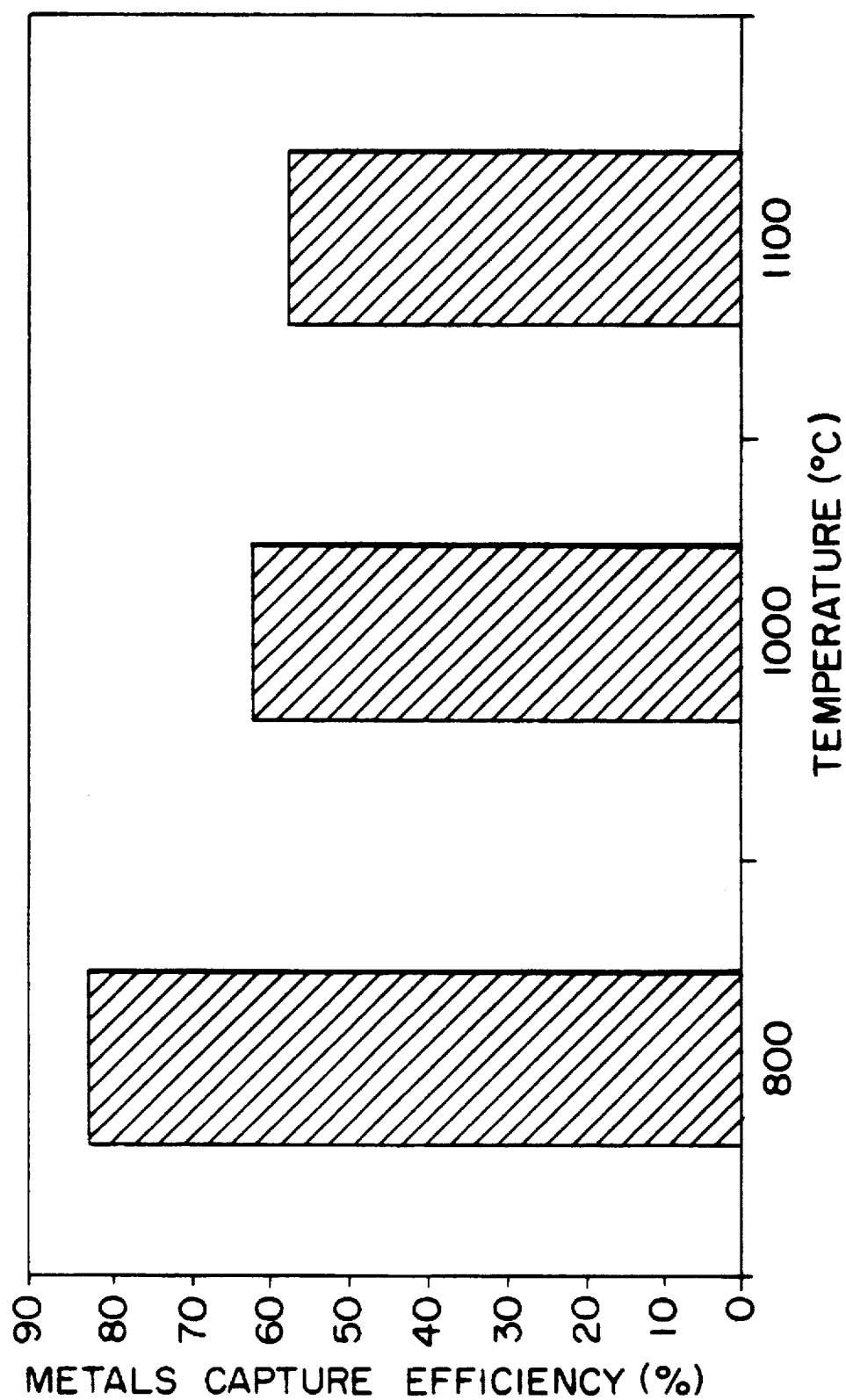
FIG. 8 is a graph showing the percentage of metals captured in the sorbent pellet as a function of temperature.

The level of capture is illustrated as a function of temperature in FIG. 8. The results show that greater than 80 percent of the metal vapor is retained by the sorbent-coated pellet at 800° C. using Celatom™ (diatomaceous earth) as the sorbent. Only about 20% of the metals were retained in the flyash only pellets (without sorbent) upon heat treatment.

In order to determine the leachability of the processed pellet, the EPA-recommended Toxicity Characteristic Leaching Procedure (TCLP) was performed on both the incinerator flyash and the sorbent-coated pellet. This method is described in detail in 40 C.F.R. 261 (Appendix II) as method 1311. The method involves extracting the solid phase with an amount of extraction fluid equal to 20 times the weight of the solid. The extraction fluid employed is determined by the alkalinity of the solid, and is generally an aqueous solution having pH ranging from 2.8 to 5.0. The solid and the extraction fluid are combined and the mixture is agitated for about 18±2 hours, then is filtered through a 0.6–0.8 μm filter. The extract is analyzed for metals using atomic absorption or emission spectroscopy. The results are shown in Table 3. The results show that lead, which was the only metal of concern present in large concentrations in the flyash, was completely immobilized in the processed pellet. The untreated flyash exhibited lead leachability which was almost four times the EPA limit.

TABLE 3

LEACHABILITY OF LEAD IN INCINERATOR FLYASH BEFORE AND AFTER IMMOBILIZATION

| Sample | Estimated Loading mg/kg by HF Extracting | Leachability (TCLP) mg/L |
|---|---|---|
| MSW Incinerator Flyash | 2980 | 19.0 |
| Processed Flyash | 1490 | Not detectable |

Figure 9:
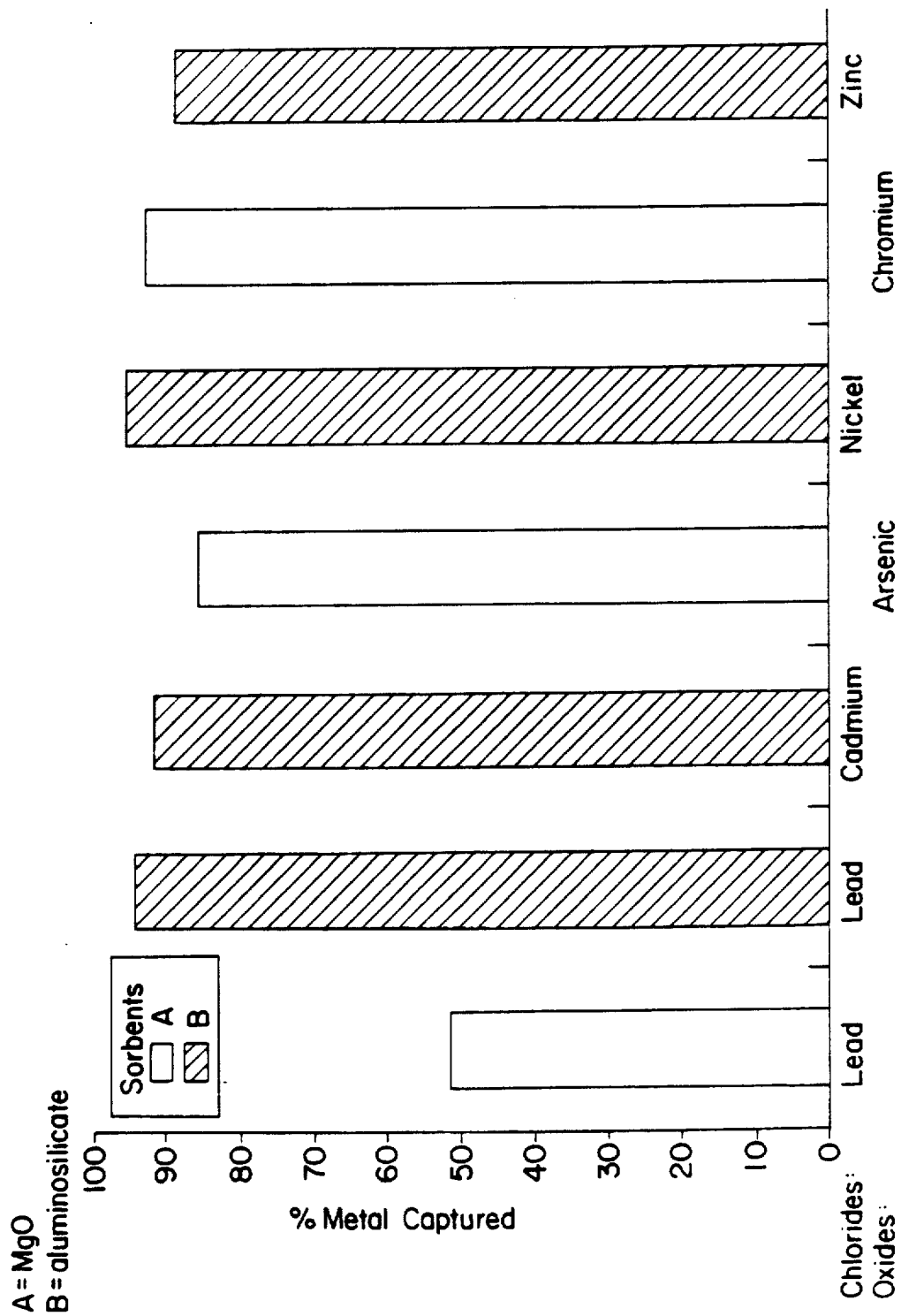
FIG. 9 is a graph showing the percentage of metals captured by (A) a magnesium oxide sorbent, and (B) an aluminosilicate sorbent.

A second series of pelletization experiments was performed using compounds of individual metals. The compounds tested were lead chloride ($PbCl_2$), cadmium chloride ($CdCl_2$), nickel chloride ($NiCl_2$), zinc chloride ($ZnCl_2$), barium chloride ($BaCl_2$), arsenic oxide ($As_2O_3$), and chromium (VI) oxide ($CrO_3$). All of these compounds are water-soluble. The pellets were made by compressing 100 mg of the metal compound with 1.5 gm of the sorbent. The pellet was prepared such that the metal compound was in the center of the pellet surrounded by the sorbent. The pellets were then heated as described above. The efficiency of capture of the different metals by the sorbents is shown in FIG. 9. The results indicate that greater than 85 percent of Pb, Cd, Ni and Zn were captured by the diatomaceous earth sorbent. Greater than 80 percent of all metals, including Cr and As, were captured by the MgO sorbent. The sorbents used and the process conditions for each of the metals is described hereinbelow.

Entrained Flow Experiments

Figure 10:
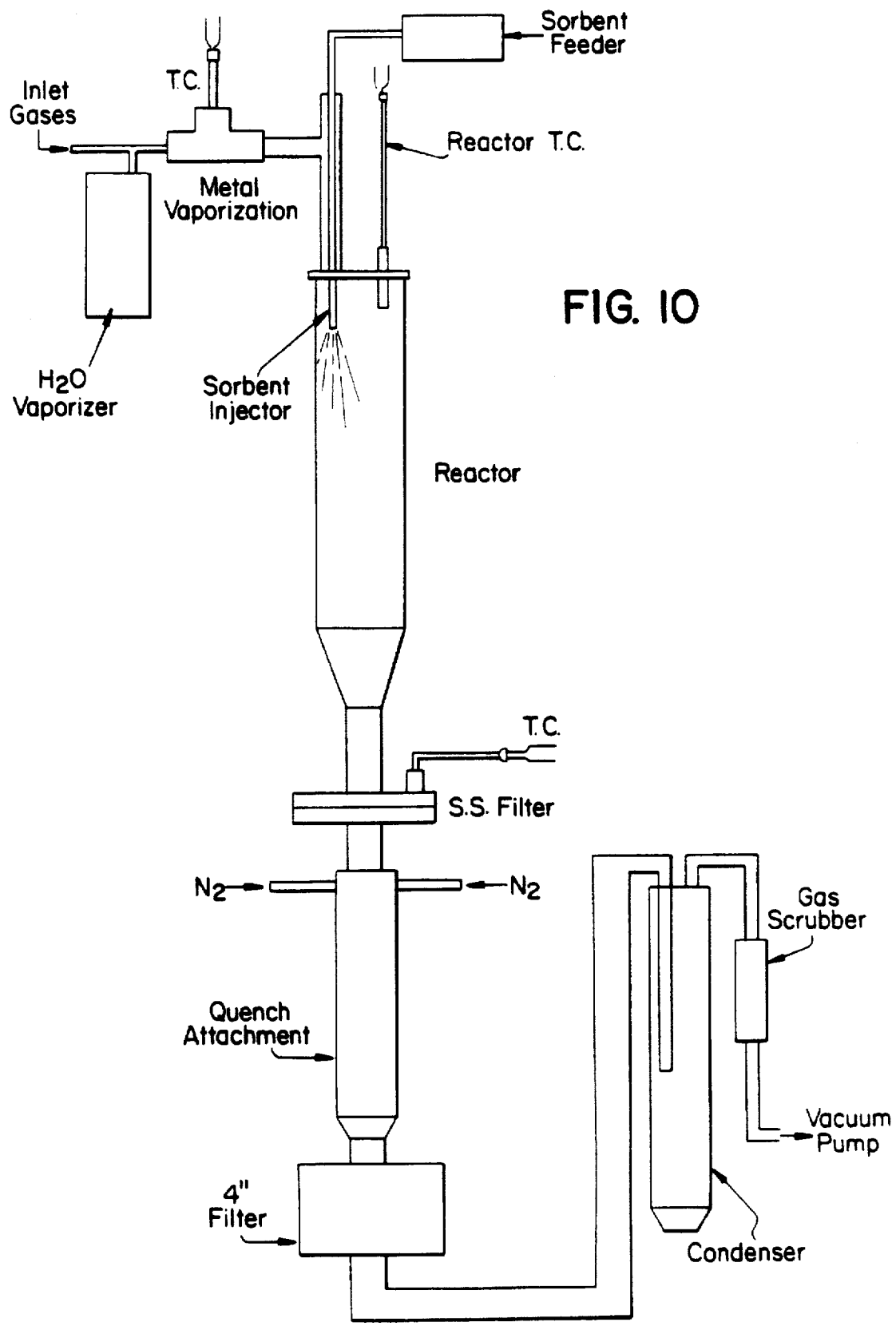
FIG. 10 is a schematic illustration of an entrained flow apparatus used to carry out the process of the invention.

The configuration of the apparatus for the entrained flow capture experiments is shown in FIG. 10. A heated cell was used to vaporize the metal species which were then carried into the reaction zone. Sorbent particles (smaller than 50 microns) were introduced into the reaction zone in suspension flow. The residence time for reaction was approximately 1 to 3 seconds. The temperatures for the reaction were varied between 400° and 1000° C. The reacted sorbent particles were collected in a stainless steel filter, which was maintained at a high temperature. The filter allowed the gas phase metal species that were not captured by the sorbent to pass through. This stream was then cooled to 25° C. to condense out the metal species, which were collected in another filter.

Initial tests with arsenic oxide indicated that magnesium oxide and calcium oxide captured some of the arsenic species to form calcium/magnesium arsenates at 1000° C.

Lead

Gas phase lead species including oxides, chlorides and oxychlorides were captured when contacted with a fixed bed of aluminosilicate sorbent. Contacting the waste with the sorbent by pelletization and then processing was also successful in metal immobilization. Other methods of contact, like a fluidized bed or an entrained flow reactor can also be employed. Sorbents tested included aluminum-containing compounds (e.g. $Al_2O_3$, bauxite), silicon-containing compounds (e.g. $SiO_2$) and aluminosilicates (e.g. kaolinite, emathlite, diatomaceous earth). In the absence of HCl, significant levels of capture were obtained at temperatures as high as 1100° C. Capture at even higher temperatures is likely. In the presence of 400 ppm HCl in the gas stream, vaporized lead species were captured at temperatures below 850° C. Higher levels of HCl decrease the efficiency of capture as well as the optimum temperature for capture. The best sorbents contained both aluminum and silicon oxides, i.e. were aluminosilicates. The suggested reaction is that between the vapor phase lead species and the aluminosilicate sorbent to form lead aluminosilicates. The product is water-insoluble (hence, non-leachable).

Cadmium

Heating the mixture of cadmium chloride ($CdCl_2$) with an aluminosilicate at temperatures between 500°–600° C., in the presence of water and oxygen will form cadmium oxide (CdO), and cadmium alumino-silicates. Both products are water-insoluble. CdO will form at temperatures between 500°–600° C. in the presence of oxygen. When cadmium chloride was mixed with diatomaceous earth or emathlite (calcium-containing aluminosilicate), pelletized, and then heated as described in the pelletization experiments above, almost all of the cadmium was retained in the pellet, but in an undetermined form. The presence of HCl in the gas stream reduced the capture efficiency by about 40 percent at 850° C.

Nickel

Nickel can be found in waste in many forms, both soluble and insoluble. Nickel chloride ($NiCl_2$), which has a melting point of 1000° C. and is soluble, was the compound examined in the development of the present process. The goal of the experiments was to convert the nickel chloride to the insoluble nickel oxide which has a very high melting point (1984° C.). The optimum conditions for this to occur were found to be at a temperature less than the melting point (1000° C.) and in the presence of oxygen. Heating to too high a temperature may vaporize some of the $NiCl_2$ before the reaction to NiO can take place. This reaction takes place at 850° C. and the presence of HCl in the gas stream does not appear to be a hindrance. Nickel silicates are also thermodynamically favored to be formed by reaction of nickel compounds with aluminosilicate sorbents. A temperature of around 900° C. allowed the interaction of $NiCl_2$ with the aluminosilicate sorbent in the presence of water vapor. If nickel sulfate ($NiSO_4$), which is water-soluble is present, reaction with the aluminosilicate sorbent is expected to occur at around 800° C. (decomposition temperature). For nickel nitrate the reaction is expected to start around 200° C.

Chromium

Another metal found in several types of waste streams that is the cause of great concern is chromium. It is used in the plating industry, and in refractories, and forms many different noxious compounds during processing. Of particular interest is hexavalent chromium which is highly water soluble. The experiments focused on transforming $CrO_3$ to $Cr_2O_3$ which is water insoluble and has a high melting point. This reaction occurred at less than 500° C. and was not reversible. The presence of oxygen did not affect the transformation. Other hexavalent chromium forms in waste streams can be converted to trivalent chromium by employing reducing conditions and/or high temperatures. For example, both magnesium and calcium oxides are thermodynamically favored to react with hexavalent chromium compounds under reducing conditions and elevated temperatures to form magnesium or calcium chromates ($MgO.Cr_2O_3$) or ($CaO.Cr_2O_3$) both of which are water insoluble and non-leachable. Reducing conditions can be imparted by mixing an oxygen-seeking substance in the pellet (e.g. carbonaceous substances like coal, char) or by performing the heating in a reducing atmosphere (e.g. CO, hydrogen-containing or hydrocarbon-containing gases).

Arsenic

Arsenic is a naturally-occuring element, most of the water-soluble compounds of which are poisonous. Arsenic compounds are used in the semiconductor, insecticide and fertilizer industries. Process waste streams resulting from the manufacture of these compounds are prime targets for toxic remediation. Arsenic is also found in MSW (municipal solid waste) ash, commonly in the form of $As_2O_3$, arsenic trioxide, the compound used in these experiments. The aim was to form a water-insoluble compound. To that end, MgO and CaO were used as sorbents to form magnesium and calcium orthoarsenates. The results indicate that this reaction becomes favorable above 300°–400° C. Other alkaline earth compounds (e.g. calcium hydroxide, magnesium hydroxide, calcined dolomite, calcium acetate, magnesium acetate or their mixtures) react with arsenic compounds to form arsenates. In order to make the reaction product water-insoluble, an oxidizing atmosphere is preferred. The sorbents can be employed by (i) injecting into the flue gas (entrained flow), or (ii) in a defixed or fluidized bed, or (iii) mixed with the waste to form a pellet as described above.

Zinc

Zinc chloride ($ZnCl_2$) is treated to form ZnO or to react with the sorbent to form zinc silicates both of which are water-insoluble. ZnO will form at temperatures below 500° C. in the absence of the HCl and with oxygen. Aluminosilicate sorbents are preferred for treating zinc-containing wastes.

Barium

The use of aluminosilicate sorbents with barium-containing wastes in the above processes results in formation of water-insoluble barium silicates and aluminosilicates based on thermodynamic calculations.

Beryllium

Beryllium compounds also react with aluminosilicate sorbents to form water-insoluble beryllium silicates or aluminosilicates based on thermodynamic calculations.

Equivalents

Those skilled in the art will be able to ascertain using no more than routine experimentation, many equivalents to the specific embodiments described herein. Such equivalents are intended to be covered by the following claims.

We claim:

1. A process for treating waste, soils or other material contaminated with mercury in order to render the mercury non-leachable, comprising:
   a. heating the waste, soils or other material to a temperature sufficient to volatilize the mercury and to form a gas stream having mercury vapor and ash particles entrained therein;
   b. providing in contact with the gas stream a carbonaceous material which adsorbs the mercury thereby removing it from the gas stream, and removing the carbonaceous material with the mercury adsorbed thereon from the gas stream;
   d. separating the carbonaceous material from the ash particles; and
   e. recovering the mercury by heating the mercury-laden carbonaceous material in the presence of a purge gas to a temperature sufficient to volatilize the mercury thereby forming a gas stream containing mercury Vapor and cooling the gas stream to a temperature sufficient to condense the mercury.

2. The process of claim 1 further comprising the step of contacting the gas stream with a high surface area silicate compound prior to step (c).

3. The process of claim 2 wherein the sorbent contains calcium or magnesium.

4. The process of claim 1 wherein step (a) is performed in a combustion chamber.

5. The process of claim 1 wherein the waste, soils or other materials contaminated with mercury further comprise organic matter.

6. The process of claim 5 wherein the temperature of step (a) is sufficient to remove the organic matter from the waste.

7. The process of claim 1 wherein the temperature of step (a) is in the range of from about 300° C. to about 1500° C.

8. The process of claim 1 further comprising the step of adding a chlorinated compound to the waste, soils or other material, thereby forming mercury chlorides in step (a).

9. The process of claim 8 wherein the amount of chlorine added is about 100 ppm of the waste, soils or other material.

10. The process of claim 1 further comprising the step of removing particles having a diameter of greater than 10μ from the gas stream prior to step (c).

11. The process of claim 1 wherein step (d) is performed by forming an intimate mixture between the particles and sorbent.

12. The process of claim 1 further comprising the step of separating the metal-coated ash particles from the gas stream prior to step (c).

13. The process of claim 12 wherein the ash particles are collected on a filter having a pore size of 10μ or less.

14. The process of claim 1 further comprising the step of compressing the combination formed in step (c) to form pellets, briquettes or bricks.

15. The process of claim 14 wherein the pellet, briquette or brick comprises a core formed from the metal-coated ash surrounded by a layer of sorbent.

16. The process of claim 1 wherein the temperatures used in step (d) are from about 300° C. to about 900° C.

17. A process for treating wastes, soils or other materials contaminated with metals including mercury comprising:
   a. heating the waste, soils or other material to a temperature sufficient to volatilize the metals and the mercury thereby forming a gas stream having metal vapor, including mercury vapor, and ash particles entrained therein;
   b. cooling the gas stream sufficiently to cause condensation of the metal vapors onto the surface of the ash particles;
   c. providing in contact with the gas stream a carbonaceous sorbent comprising particles having a diameter of 100 microns or less which adsorb the mercury vapor thereby removing the mercury from the gas stream;
   d. removing the metal-coated ash particles and the carbonaceous sorbent with the mercury adsorbed thereon from the gas stream; and
   e. separating the ash particles from the carbonaceous sorbent using electrostatic separation, size classification or density separation methods.

18. The process of claim 17 wherein the carbonaceous sorbent is activated carbon.

19. The process of claim 17 wherein the carbonaceous sorbent is carbon doped with metal halide salts which is obtained by mixing the sorbent with an aqueous solution saturated with the metal halide, cooling the solution to precipitate the metal halide and filtering, the precipitate to recover the doped carbon.

20. The process of claim 17 wherein the carbonaceous sorbent is unburnt carbonaceous combustion residue.

21. The process of claim 17 wherein the carbonaceous sorbent is in the form of an aqueous slurry.

22. The process of claim 21 wherein the aqueous slurry further comprises an oxidizing compound.

23. The process of claim 21 wherein the aqueous slurry further comprises ammonia, ammonium chloride, ammonium hydroxide or sodium hydroxide.

24. The process of claim 17 further comprising the step of treating the carbonaceous sorbent after step (e) to separate the mercury from the sorbent thereby regenerating the sorbent.

25. The process of claim 24 wherein the treating step is carried out by contacting the carbonaceous sorbent with an aqueous or acidic solution under conditions sufficient to solubilize the mercury thereby removing it from the sorbent.

26. The process of claim 24 wherein the regenerated sorbent is reused in step (b).

27. A process for treating in situ waste, soils or other materials contaminated with mercury wherein said waste, soils or other materials comprise a carbonaceous sorbent reactive with mercury, the process comprising:

heating the waste, soils or other material to a temperature sufficient to volatilize the mercury to mercury vapor, maintaining said heating for a time and at a temperature sufficient to induce said mercury vapor to adsorb to the carbonaceous sorbent, and removing the mercury-laden carbonaceous sorbent.

28. The process of claim 27 wherein the heating step is performed by applying electromagnetic energy to the waste, soils or other material.

29. The process of claim 28 wherein the electromagnetic energy is supplied by electrodes.

30. The process of claim 27 comprising the additional step of mixing additional sorbent to the waste, soils or other materials prior to the heating step.

31. The process of claim 30 wherein the sorbent is layered on top of the waste, soils or other materials prior to heating.

32. The process of claim 27 wherein the temperature is in the range of from about 300° C. to about 1000° C.

33. The process of claim 32 wherein the sorbent is selected from the group consisting of silicate compounds, aluminosilicate compounds and alkaline earth compounds.

34. The process of claim 32 wherein the temperature in step (b) is in the range of from about 300° C. to about 1200° C.

35. A process for treating waste, soils or other material contaminated with metals in order to render the metals non-leachable, comprising:

a. combining the metal-contaminated waste, soils or other material with a sorbent which is chemically reactive with the metals thereby forming an intimate mixture thereof;

b. heating the combination formed in step (a) to a temperature sufficient to render the metals reactive or to volatilize the metals thereby forming metal vapors; and c. maintaining the heating for a time sufficient to induce a chemical reaction between the reactive metals or metal vapors and the sorbent thereby forming a substantially non-leachable metal-sorbent complex.

* * * * *

UNITED STATES PATENT AND TRADEMARK OFFICE
CERTIFICATE OF CORRECTION

PATENT NO. : 5,556,447
DATED : September 17, 1996
INVENTOR(S) : Srivats Srinivasachar, Joseph Morency and Daniel C. Itse It is certified that error appears in the above-indentified patent and that said Letters Patent is hereby corrected as shown below:

Column 1, line 5,

---Government Support

The present invention was made with support from a grant from the Environmental Protection Agency. The government has certain rights in this invention.---

Signed and Sealed this

Tenth Day of December, 1996

*Attest:*

BRUCE LEHMAN

*Attesting Officer*     *Commissioner of Patents and Trademarks*